US009306605B1

(12) United States Patent
Van Der Tuijn et al.

(10) Patent No.: US 9,306,605 B1
(45) Date of Patent: Apr. 5, 2016

(54) ELECTRONIC DEVICE HAVING FREQUENCY SHIFTING UART

(71) Applicant: STMicroelectronics International N.V., Amsterdam (NL)

(72) Inventors: Roland Van Der Tuijn, Mouans-Sartoux (FR); Yoann Bouvet, Opio (FR)

(73) Assignee: STMicroelectronics International N.V., Amsterdam (NL)

( * ) Notice: Subject to any disclaimer, the term of this patent is extended or adjusted under 35 U.S.C. 154(b) by 0 days.

(21) Appl. No.: 14/596,026

(22) Filed: Jan. 13, 2015

(51) Int. Cl.
*H04B 1/38* (2015.01)
*H04B 1/04* (2006.01)
*H04B 1/10* (2006.01)

(52) U.S. Cl.
CPC ............... *H04B 1/0475* (2013.01); *H04B 1/10* (2013.01); *H04B 1/38* (2013.01)

(58) Field of Classification Search
CPC ........... H04B 1/0475; H04B 1/10; H04B 1/38
See application file for complete search history.

(56) References Cited

U.S. PATENT DOCUMENTS 6,263,192 B1 * 7/2001 Alderton ............... H02M 3/156
  455/557
2012/0297233 A1 * 11/2012 Ross ................ H04N 21/23602
  713/502

* cited by examiner

*Primary Examiner* — David B. Lugo
(74) *Attorney, Agent, or Firm* — Gardere Wynne Sewell LLP

(57) ABSTRACT

An electronic device includes a radio configured to operate at an operating frequency, and a first universal asynchronous receiver/transmitter (UART) configured to operate as a master and at a baud rate. The electronic device also includes a second UART configured to communicate with the first UART, operating as a slave. The second UART has a controller configured to generate a frequency shift based upon the operating frequency of the radio being evenly divisible by the baud rate, and a baud clock generator. The baud clock generator is configured to generate an operating baud rate from a master clock signal, with the operating baud rate to be the baud rate shifted by the frequency shift. Transmitter circuitry is configured to operate based on the operating baud rate, and receiver circuitry is configured to operate based on the operating baud rate.

26 Claims, 1 Drawing Sheet

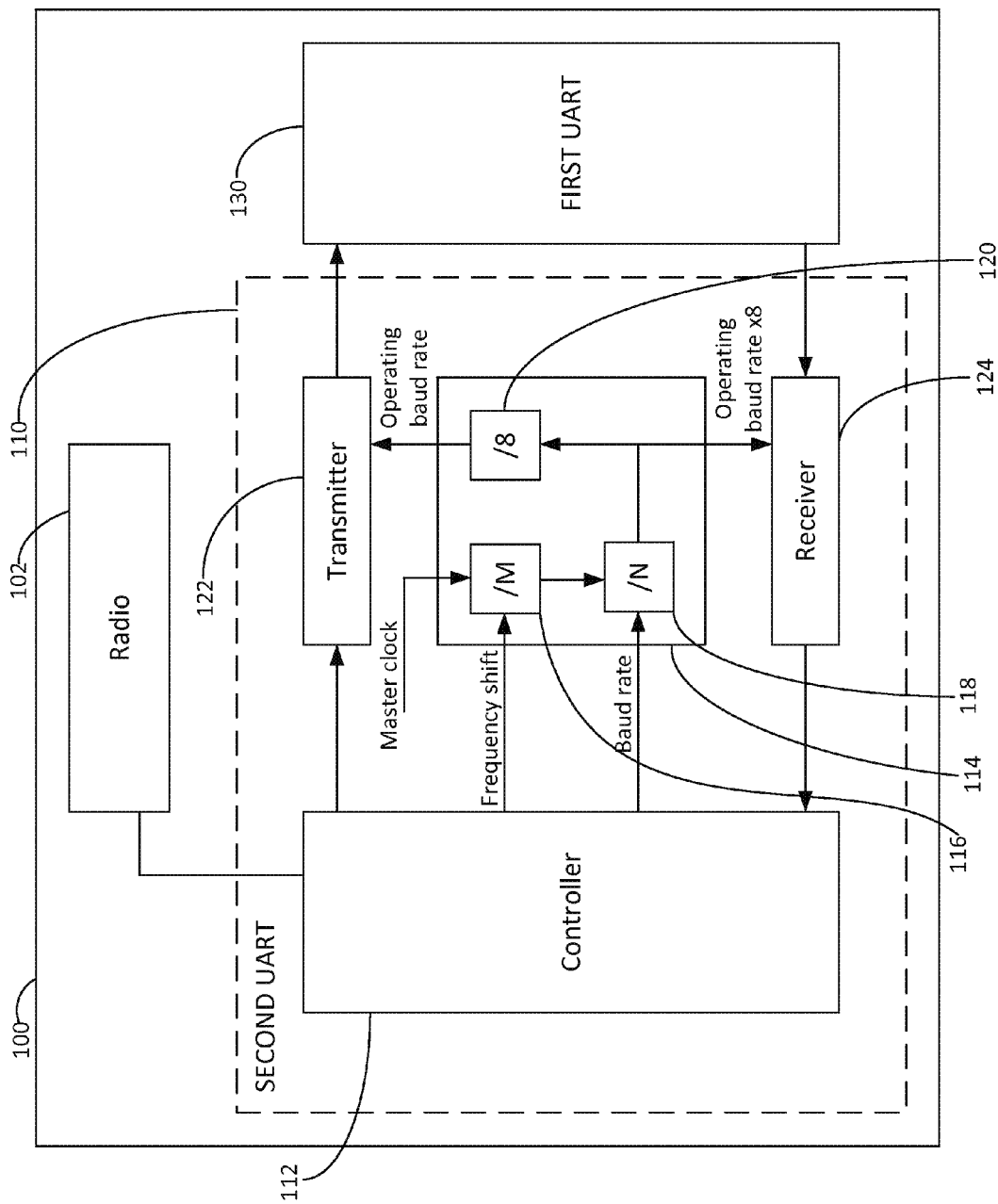

ELECTRONIC DEVICE HAVING FREQUENCY SHIFTING UART

FIELD OF THE DISCLOSURE

This disclosure is related to the field of electronic devices, and more particularly, to electronic devices having UARTs that frequency shift their baud rates to avoid interference with other signals.

BACKGROUND

Modern electronic devices may have multiple circuits or devices on a single printed circuit board. Some of these circuits or devices may communicate with one another using serial communications handled by respective universal asynchronous receiver/transmitters (UARTs). However, such electronic devices may also include a radio or associated circuitry.

Therefore, the possibility of interference between the circuits or devices communicating serially with UARTs, and the radio or associated circuitry, is high. This interference could degrade performance of the electronic device or the radio, and could provide for a negative user experience.

While devices and methods exist for reducing or eliminating this interference, they may involve the cooperation of all UARTs. This may increase the complexity of the electronic devices, and likewise may increase the cost of the electronic devices.

Consequently, further development of electronic devices having UARTs able to reduce interference with an on-die radio is desirable.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

One aspect is directed to a system including a circuit configured to operate at a communications frequency, and a UART configured to support data communications in accordance with a baud rate. The UART is further configured to shift the baud rate so that the communications frequency is not evenly divisible by the baud rate.

The circuit may be a radio circuit and the communications frequency may be a channel frequency for radio communications. The radio circuit may be one of an FM radio circuit, a Bluetooth circuit, a WiFi circuit, and a GPS circuit.

Another aspect is directed to an electronic device including a radio configured to operate at an operating frequency, and a first universal asynchronous receiver/transmitter (UART) configured to operate as a master and at a baud rate. The electronic device also includes a second UART configured to communicate with the first UART, operating as a slave. The second UART has a controller configured to generate a frequency shift based upon the operating frequency of the radio being evenly divisible by the baud rate, and a baud clock generator. The baud clock generator is configured to generate an operating baud rate from a master clock signal, with the operating baud rate to be the baud rate shifted by the frequency shift. Transmitter circuitry is configured to operate based on the operating baud rate, and receiver circuitry is configured to operate based on the operating baud rate.

The baud clock generator may include a frequency shift divider configured to divide the master clock signal down to a shifted master clock signal. A first divider may be configured to divide the shifted master clock signal down to an oversampled shifted operating baud rate. A second divider may be configured to divide the oversampled shifted operating baud down to the shifted operating baud rate. The frequency shift may be a shift by a percentage no less than the master clock signal divided by the baud rate.

The baud clock generator may include a first divider configured to divide the master clock signal down to an oversampled operating baud rate, and a second divider configured to divide the oversampled operating baud rate down to the operating baud rate.

The transmitter circuitry and receiver circuitry may operate based upon a single transition of each pulse of the operating baud rate and the oversampled operating baud rate. In other applications, the transmitter circuitry and receiver circuitry may operate based upon rising and falling transitions of each pulse of the operating baud rate and the oversampled operating baud rate. The frequency shift in this case may be a shift by a percentage no less than half of the master clock signal, divided by the baud rate.

Another aspect is directed to an electronic device having a radio configured to operate at an operating frequency, a first universal asynchronous receiver/transmitter (UART) configured to operate as a master and at a baud rate, and a second UART configured to communicate with the first UART, operating as a slave. The second UART includes a controller configured to generate a frequency shift based upon the operating frequency of the radio being evenly divisible by the baud rate, and a baud clock generator configured to generate an operating baud rate from a master clock signal, the operating baud rate to be the baud rate shifted by the frequency shift. Transmitter circuitry is configured to operate based on the operating baud rate, and receiver circuitry is configured to operate based on the operating baud rate.

A further aspect is directed to an electronic device including first and second dies, and a radio formed in the second die and configured to operate at an operating frequency. A master universal asynchronous receiver/transmitter (UART) is formed in the first die and configured to operate at a baud rate. A slave UART is formed in the second die and configured to communicate with the master UART. The slave UART includes a controller configured to receive the baud rate from the master UART, receive the operating frequency from the radio, send the baud rate and the operating frequency, and generate a frequency shift based upon the operating frequency of the radio being evenly divisible by the baud rate. A baud clock generator is configured to receive the baud rate and the operating frequency from the controller, and generate an operating baud rate from a master clock signal, the operating baud rate being the baud rate shifted by the frequency shift such that digital switching within the slave UART does not interfere with analog signals generated in the radio. Transmitter circuitry is configured to operate based on the operating baud rate, and receiver circuitry is configured to operate based on the operating baud rate.

BRIEF DESCRIPTION OF THE DRAWINGS

FIG. 1 is a schematic block diagram of an electronic device in accordance with this disclosure.

DETAILED DESCRIPTION

One or more embodiments of the present disclosure will be described below. These described embodiments are only examples of the presently disclosed techniques. Additionally, in an effort to provide a concise description, all features of an actual implementation may not be described in the specification.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Like reference numbers in the drawing figures refer to like elements throughout.

With reference to FIG. 1, an electronic device 100 is now described. The electronic device 100 may be formed on a single printed circuit board, may be a package of multiple silicon dies, or in some cases may be a single silicon die. The electronic device 100 includes a radio 102 configured to transmit and/or receive at an operating frequency. Transmission or reception may be use frequency modulation (FM), and be at 90 Mhz, for example. The radio 102 may also be a Bluetooth circuit, WiFi circuit, GPS circuit, or any other suitable radio circuit. In fact, rather than a radio 102, any noise sensitive circuit may be used.

The electronic device 100 also includes a first UART 130 configured to act as a master UART and a second UART 110 configured to act as a slave UART. The slave UART 110 includes a controller 112 coupled to a baud clock generator 114, a transmitter 122, and a receiver 124.

The controller 112 knows the baud rate to be used for transmissions between the master UART 130 and slave UART 110, for example via an auto baud detection technique, via an initially defined baud rate, or via a communication from the master UART 130. The controller 112 sends this baud rate to the baud clock generator 114. The baud clock generator 114 generates an operating baud for use by the transmitter 122 and receiver 124. The operating baud, as will be explained in detail below, is generated by dividing a master clock signal down.

The controller 112 also knows the operating frequency of the radio 102, for example from internal system knowledge. The controller 112 may in some applications directly control the radio 102, or may in some applications receive the operating frequency from the radio 102. If the operating frequency is evenly divisible by the baud rate, the baud rate signal or a harmonic thereof could cause interference with the signal transmitted or received on the operating frequency by the radio 102. Therefore, if the controller determines that the operating frequency is evenly divisible by the baud rate, as will be explained below, it operates to shift the baud rate by an amount that does not adversely affect communications with the master UART 110, yet avoids the interference with the radio 102 by making the operating frequency not evenly divisible by the baud rate.

The frequency shift used by the controller depends on the number of bits per packet transferred. For example, a packet may contain a start bit and a stop bit, with eight data bits between the start bit and stop bit. A packet may also contain a parity bit. In the case where a packet contains 10 bits total, the difference between the operating baud rate of the slave UART 110 and the baud rate used by the master UART 130 can be less than 5% so as to avoid communication errors between the slave UART 110 and the master UART 130, and so that the master UART 130 can continue to operate at the baud rate without change. This is calculated via the following:

$$\text{Max Frequency Shift} = 100\% * \frac{1}{2*\text{number of bits transmitted each period}} * \frac{1}{\text{total number of bits in packet}}$$

For example, in the case where 1 bit is to be transmitted for each period (i.e. 1 bit per clock cycle), and there are 10 bits in each packet, the difference between the operating baud rate of the slave UART 110 and the master UART 130 is, when operating according to the above formula, at most 5%.

So as to avoid interference by the operating baud rate with the radio, the shift can helpfully be a ratio between the baud rate and the master clock rate CLK. Therefore, the frequency shift can be mathematically represented as:

$$\text{Baud rate} = \frac{CLK}{N}$$

The frequency shift can be implemented by skipping or adding 1 cycle to the master clock rate CLK, thus the minimum frequency shift would be:

$$F_{shift} = \frac{1}{N} = \frac{\text{Baud rate}}{CLK}$$

In another application, the frequency shift can be implemented by skipping or adding ½ cycle to the master clock rate CLK, thus the minimum frequency shift would be:

$$F_{shift} = \frac{2}{N} = \frac{\text{Baud rate}}{2*CLK}$$

Further details of the operation of the baud clock generator 114 will now be given. The baud clock generator 114 includes a frequency shift divider 116 configured to divide the master clock by an amount M provided by the controller 112 so as to produce a shifted master clock signal. The shifted master clock signal is passed to a first divider 118 that is configured by the controller 112 to divide the shifted master clock signal down to an oversampled shifted operating baud rate. The oversampled shifted operating baud rate is in turn passed to a second divider 120 that is configured by the controller 112 to divide the oversampled shifted operating baud rate down to a shifted operating baud rate.

In operation, the frequency shift divider 116 operates to add or remove X master clock cycles per baud rate period. For example, given a master clock frequency of 96 MHz and a baud rate of 3 MHz, a shift of 1 would lead to the following baud rate shift:

$$\text{Baud rate period in master clock cycles} = \frac{CLK}{\text{Baud Rate}}$$

+1 master clock cycle shift=33 master clock pulses/baud rate=shift by 1/32=3.13%

−1 master clock cycle shift=31 master clock pulses/baud rate=shift by −1/32=−3.13%

The transmitter 122 runs based upon the shifted operating baud rate, while the receiver 124 operates based on the oversampled shifted operating baud rate. The receiver 124 operates based on the oversampled shifted operating baud rate so as to more accurately be able to detect incoming transmissions.

In the case where the operating frequency of the radio is not equally divisible by the baud rate or is not known or cannot be determined, the frequency shift divider 116 is configured by the controller 112 to divide the master clock by unity, therefore not shifting the master clock.

In this applications described above, the slave UART 110 and radio 102 are located on a single die, and the master UART 130 is located on a separate single die. Therefore, frequency shifting by the slave UART 110 is advantageous due to the radio 102 being on chip. In some applications, it may also be helpful for the master UART 130 to shift the frequency of its operating baud. It may receive the frequency shift from the slave UART 110, or may receive the operating frequency of the radio 102 from the slave UART 110 and then calculate a frequency shift based thereupon.

The above operation of the baud clock generator 114 has been described for the case where the transmitter 122 and receiver 124 are clocked at a single transition (i.e., rising edge or falling edge) of each clock pulse they receive. In the case where the transmitter 122 and receiver 122 are clocked at each transition of each clock pulse that they receive, the frequency shift can be one half of what it would be in the case of single transition clocking. Thus, for this case, the frequency shift can be represented mathematically as:

$$F_{shift} = \frac{N}{2*CLK}$$

While the disclosure has been described with respect to a limited number of embodiments, those skilled in the art, having benefit of this disclosure, will appreciate that other embodiments can be envisioned that do not depart from the scope of the disclosure as disclosed herein. Accordingly, the scope of the disclosure shall be limited only by the attached claims.

The invention claimed is:

1. A system, comprising:
a circuit configured to operate at a communications frequency; and
a UART configured to support data communications in accordance with a baud rate when the communications frequency is not evenly divisible by the baud rate, the UART further configured to generate a frequency shift based upon the communications frequency being evenly divisible by the baud rate, shift the baud rate by the frequency shift when the communications frequency is evenly divisible by the baud rate so that the communications frequency is not evenly divisible by the baud rate as shifted and support data communications in accordance with the baud rate as shifted.

2. The system of claim 1, wherein the circuit comprises a radio circuit
and the communications frequency is a channel frequency for radio communications.

3. The system of claim 2, wherein the radio circuit is one of an FM radio circuit, a Bluetooth circuit, a WiFi circuit, and a GPS circuit.

4. A universal asynchronous receiver/transmitter (UART), comprising:
a controller configured to generate a frequency shift based upon a communications frequency being evenly divisible by the baud rate;
a baud clock generator configured to
generate an operating baud rate from a master clock signal, the operating baud rate to match a baud rate when the communications frequency is not evenly divisible by the baud rate, and
generate a shifted operating baud rate from the master clock signal, the shifted operating baud rate to be the operating baud rate shifted by the frequency shift when the communications frequency is evenly divisible by the baud rate;
transmitter circuitry configured to operate based upon the operating baud rate; and
receiver circuitry configured to operate based upon one of the operating baud rate and the shifted operating baud rate.

5. The UART of claim 4, wherein the baud clock generator comprises a frequency shift divider configured to divide the master clock signal down to a shifted master clock signal.

6. The UART of claim 5, wherein the baud clock generator further comprises a first divider configured to divide the shifted master clock signal down to an oversampled shifted operating baud rate.

7. The UART of claim 6, wherein the baud clock generator further comprises a second divider configured to divide the oversampled shifted operating baud rate down to the shifted operating baud rate.

8. The UART of claim 4, wherein the frequency shift comprises a shift by a percentage no less than the master clock signal divided by the baud rate.

9. The UART of claim 4, wherein the baud clock generator comprises a first divider configured to divide the master clock signal down to an oversampled operating baud rate, and a second divider configured to divide the oversampled operating baud rate down to the operating baud rate.

10. The UART of claim 4, wherein the transmitter circuitry and receiver circuitry operate based upon a single transition of each pulse of the operating baud rate and the oversampled operating baud rate.

11. The UART of claim 4, wherein the transmitter circuitry and receiver circuitry operate based upon rising and falling transitions of each pulse of the operating baud rate and the oversampled operating baud rate.

12. The UART of claim 11, wherein the frequency shift comprises a shift by a percentage no less than half of the master clock signal, divided by the baud rate.

13. An electronic device, comprising:
a radio configured to operate at an operating frequency;
a first universal asynchronous receiver/transmitter (UART) configured to operate as a master and at a baud rate; and
a second UART configured to communicate with the first UART, operating as a slave, the second UART comprising:
a controller configured to generate a frequency shift based upon the operating frequency of the radio being evenly divisible by the baud rate,
a baud clock generator configured to generate an operating baud rate from a master clock signal, the operating baud rate to be the baud rate shifted by the frequency shift,
transmitter circuitry configured to operate based on the operating baud rate, and receiver circuitry configured to operate based on the operating baud rate.

14. The electronic device of claim 13, wherein the baud clock generator comprises a frequency shift divider configured to divide the master clock signal down to a shifted master clock signal.

15. The electronic device of claim 14, wherein the baud clock generator further comprises a first divider configured to divide the shifted master clock signal down to an oversampled operating baud rate, and a second divider configured to divide the oversampled operating baud rate down to the operating baud rate.

16. The electronic device of claim 13, wherein the transmitter circuitry and receiver circuitry operate based upon a single transition of each pulse of the operating baud rate.

17. The electronic device of claim 16, wherein the frequency shift comprises a shift by a percentage no less than the master clock signal divided by the baud rate.

18. The electronic device of claim 13, wherein the transmitter circuitry and receiver circuitry operate based upon rising and falling transitions of each pulse of the operating baud rate.

19. The electronic device of claim 18, wherein the frequency shift comprises a shift by a percentage no less than half of the master clock signal, divided by the baud rate.

20. An electronic device, comprising:
first and second dies;
a radio formed in the first die and configured to operate at an operating frequency;
a master universal asynchronous receiver/transmitter (UART) formed in the second die and configured to operate at a baud rate; and
a slave UART formed in the first die and configured to communicate with the master UART, the slave UART comprising:
a controller configured to
receive the baud rate from the master UART,
receive the operating frequency from the radio,
send the baud rate and the operating frequency,
generate a frequency shift based upon the operating frequency of the radio being evenly divisible by the baud rate,
a baud clock generator configured to
receive the baud rate and the operating frequency from the controller, and
generate an operating baud rate from a master clock signal, the operating baud rate being the baud rate shifted by the frequency shift such that digital switching within the slave UART does not interfere with analog signals generated in the radio,
transmitter circuitry configured to operate based on the operating baud rate, and
receiver circuitry configured to operate based on the operating baud rate.

21. The electronic device of claim 20, wherein the baud clock generator comprises:
a frequency shift divider configured to divide the master clock signal down to a shifted master clock signal;
a first divider configured to divide the shifted master clock signal down to an oversampled operating baud rate; and
a second divider configured to divide the oversampled operating baud rate down to the operating baud rate.

22. The electronic device of claim 20, wherein the transmitter circuitry and receiver circuitry operate based upon a single transition of each pulse of the operating baud rate; and wherein the frequency shift comprises a shift by a percentage no less than the master clock signal divided by the baud rate.

23. The electronic device of claim 20, wherein the transmitter circuitry and receiver circuitry operate based upon rising and falling transitions of each pulse of the operating baud rate; and wherein the frequency shift comprises a shift by a percentage no less than half of the master clock signal, divided by the baud rate.

24. The electronic device of claim 20, wherein the controller is further configured to send at least one of the operating frequency and the frequency shift to the master UART.

25. The electronic device of claim 24, wherein the master UART is further configured to switch to operating at an operating baud rate, the operating baud rate of the master UART being the baud rate shifted by the frequency shift, based upon receipt of the frequency shift from the slave UART.

26. The electronic device of claim 24, wherein the master UART is further configured to switch to operating at an operating baud rate, the operating baud rate of the master UART being the baud rate shifted by the frequency shift, based upon receipt of the operating frequency from the slave UART.

* * * * *